US011176222B2

(12) United States Patent
Gibson et al.

(10) Patent No.: US 11,176,222 B2
(45) Date of Patent: *Nov. 16, 2021

(54) PERSISTENT MEDIA PLAYBACK

(71) Applicant: Microsoft Technology Licensing, LLC, Redmond, WA (US)

(72) Inventors: Chad C. Gibson, Seattle, WA (US); Sara Tahir, Redmond, WA (US); Christopher A. Evans, Langley, WA (US); Marcus E. Pina, Seattle, WA (US); Richard L. Mains, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/794,082

(22) Filed: Feb. 18, 2020

(65) Prior Publication Data

US 2020/0183990 A1 Jun. 11, 2020

Related U.S. Application Data

(63) Continuation of application No. 15/617,999, filed on Jun. 8, 2017, now Pat. No. 10,572,567, which is a continuation of application No. 12/488,195, filed on Jun. 19, 2009, now Pat. No. 9,690,866.

(51) Int. Cl.
*G06F 16/958* (2019.01)
*G06F 9/451* (2018.01)

(52) U.S. Cl.
CPC ............ *G06F 16/958* (2019.01); *G06F 9/451* (2018.02)

(58) Field of Classification Search
CPC .............................. G06F 16/958; G06F 9/451
See application file for complete search history.

(56) References Cited

U.S. PATENT DOCUMENTS

| 7,716,361 | B2* | 5/2010 | Messer | G06F 16/9574 709/231 |
| 7,877,687 | B2* | 1/2011 | Blinnikka | G06F 3/0481 715/719 |
| 2002/0091762 | A1* | 7/2002 | Sohn | G06F 3/0481 709/203 |
| 2002/0126142 | A1* | 9/2002 | Hodgkinson | H04N 5/445 715/719 |
| 2003/0137531 | A1* | 7/2003 | Katinsky | G06F 16/4387 715/716 |
| 2004/0045040 | A1* | 3/2004 | Hayward | H04N 21/254 725/135 |
| 2006/0031404 | A1* | 2/2006 | Kassab | H04L 67/2804 709/218 |

(Continued)

*Primary Examiner* — Anil K Bhargava
(74) *Attorney, Agent, or Firm* — Alleman Hall Creasman & Tuttle LLP

(57) ABSTRACT

Persistent media playback techniques are described. In an implementation, a media player is served via a network for display by a browser of a device. Web pages are served via the network for display by the browser of the device. Each of the web pages is configured for integration with the media player so that the media player is persistently displayed by the browser during navigation among the web pages. The media player may be configured to play media files providing a variety of different media types. The media player may also provide contextual suggestions of media.

20 Claims, 6 Drawing Sheets

(56) References Cited

U.S. PATENT DOCUMENTS

| | | | | |
|---|---|---|---|---|
| 2007/0033531 | A1* | 2/2007 | Marsh | G06Q 30/02 715/738 |
| 2007/0260700 | A1* | 11/2007 | Messer | G06F 16/9574 709/217 |
| 2008/0028037 | A1* | 1/2008 | Moyer | G06Q 10/10 709/217 |
| 2009/0049385 | A1* | 2/2009 | Blinnikka | G06F 3/0481 715/719 |
| 2009/0113301 | A1* | 4/2009 | Fisher | G06F 8/61 715/716 |
| 2009/0164641 | A1* | 6/2009 | Rogers | G06Q 30/02 709/227 |
| 2009/0249222 | A1* | 10/2009 | Schmidt | H04L 51/32 715/751 |
| 2010/0281042 | A1* | 11/2010 | Windes | H04N 21/4325 707/756 |
| 2011/0022984 | A1* | 1/2011 | van der Meulen | G06F 9/44526 715/830 |

* cited by examiner

PERSISTENT MEDIA PLAYBACK

CROSS REFERENCE TO RELATED APPLICATIONS

This application is a continuation of U.S. patent application Ser. No. 15/617,999 filed Jun. 8, 2017, which is a continuation of U.S. patent application Ser. No. 12/488,195, filed Jun. 19, 2009, and entitled "PERSISTENT MEDIA PLAYBACK", now granted as U.S. Pat. No. 9,690,866, the entire disclosures of each of which are hereby incorporated herein by reference.

BACKGROUND

The popularity of online digital media stores is ever increasing. Online digital media stores may be configured as websites that allow consumer users to purchase a variety of digital media such as music, video, games, podcasts, audio books, applications, and so on. Typically, customers browse digital media made available on various web pages within an online digital media store website. For example, users may access descriptive material (e.g., titles, artist information, album cover art, and so on) that describe the content of digital media available for purchase and/or download by the user. In some instances, users may further access previews of the digital media. The user may then purchase and/or download files containing the selected digital media to a client device such as a digital media player, a mobile telephone, a computer, and so forth associated with the user via a network such as the Internet. The user may then play the digital media using the client device.

SUMMARY

Persistent media playback techniques are described. In an implementation, a media player is served via a network for display by a browser of a device. One or more web pages may then be served via the network for display by the browser of the device with the media player. The web pages are configured for integration with the media player so that the media player is persistently displayed by the browser. The media player may be configured to play media files providing a variety of different media types. The media player may also be configured to provide contextually relevant information during playback of the media.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
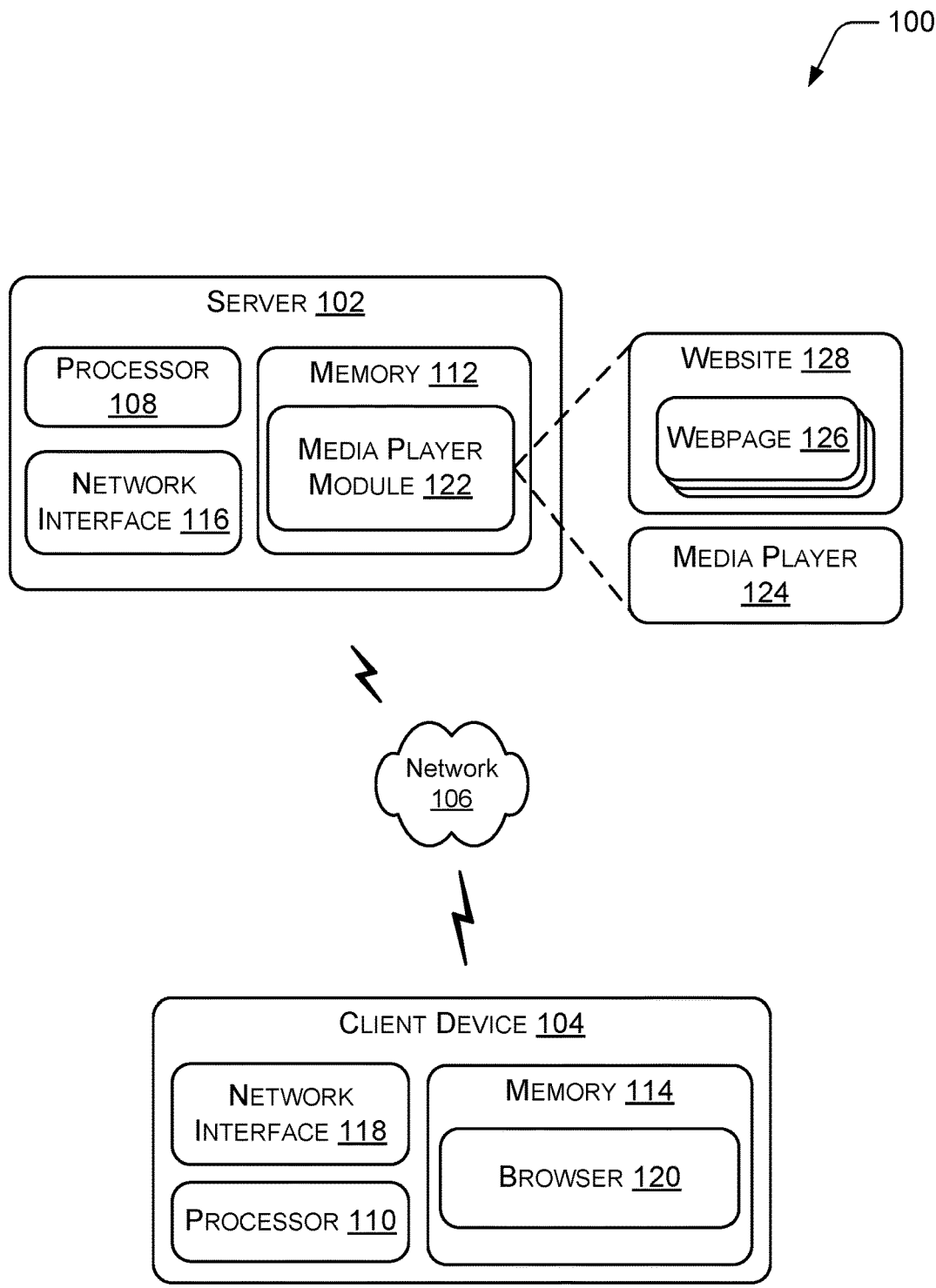
FIG. 1 is an illustration of an environment in an example implementation that is operable to provide persistent media playback across a web browsing session without the installation of client side components.

Online digital media stores often allow users to play media while viewing web pages within the online digital media store website. However, a user is typically limited to the media in the specific web page that the user is currently viewing. Therefore, if the user navigates away from the web page that contains the media to a different web page, the media is not available to the user and thus cannot be played. For example, a user may choose to play a song selected from a web page within an online digital media store that offers music. The user may then navigate to a web page within the store that offers videos, which causes playback of the selected song to stop. Previous techniques that were developed to address these issues involved installation of client side components such as browser plug-ins, which lessened the user experience.

Techniques are described to provide persistent media playback across a web browsing session without the installation of client side components. In an implementation, a media player is served via a network for display by a browser of a client device. Web pages within the online digital media store website are served via the network for display by the browser of the device. The web pages are configured for integration with the media player so that the media player is persistently displayed by the browser during navigation among the web pages of the website, during operations performed on the web page (e.g., scrolling), and so on. For instance, in one embodiment, the media player may be configured as a web page in which subsequent web pages of the online digital media store website are presented.

In one or more implementations, the persistent media player is implemented to play media files, which may be configured as a variety of different media types. The media may be selected from various web pages of the online media store website and added to and/or removed from a queue within the media player for eventual playback as the user navigates from web page to web page of the website.

The persistent media player may also be configured for delivery of targeted media, e.g., targeted marketing, content targeted to the currently playing media item or user, and so forth. For instance, the media player may be configured to provide context-based suggestions of other media. In an implementation, media may be suggested based on an analysis of the user's prior choices of media (e.g., media added to the queue of the media player), the user's profile, targeted promotions, and so forth. For example, media may be suggested for the same or similar artists, for the same genre, media that was selected by other users who also selected media that was added to the queue by the user, media that is part of a targeted promotion of media, and so forth.

In the following discussion, an example environment is first described that is operable to provide persistent media playback across a web browsing session. Example procedures are then described which may be employed in the example environment, as well as in other environments without departing from the spirit and scope thereof.

Example Environment

FIG. 1 illustrates an environment 100 in an example implementation that is operable to provide persistent media playback across a web browsing session without the installation of client side components. The illustrated environment 100 includes a server 102, which may be operated by a service provider, and a client device 104 associated with a client of the service provider. As shown, the server 102 and client device 104 may be configured to communicate via a network 106.

The server 102 may be configured in a variety of ways. In one implementation, the server 102 may be an application service provider (ASP) that is operable to provide services to client devices 104. For example, the service provider may operate an online media store and the server 102 may be configured to provide an online media store website to clients of the service provider.

The client device 104 may also be configured in a variety of ways. For example, the client device 104 may be configured as a computer such as a desktop or laptop computer that is capable of communicating over a wired or wireless network. The client device 104 may also be configured as a mobile connected device such as a digital media player, a personal digital assistant, a smart phone, or a cell phone that is capable of communicating over a wireless network; an entertainment appliance; a set-top box communicatively coupled to a display device; a game console, and so forth. Thus, the client device 104 may range from full resource devices with substantial memory and processor resources (e.g., a personal computer, a game console, etc.) to comparatively low-resource devices with limited memory and/or processing resources (e.g., a mobile phone, a netbook, a set-top box, etc.).

The network 106 may assume a wide variety of configurations. For example, the network 106 may include the Internet, a wide area network (WAN), a local area network (LAN), a wireless network (e.g., a WIFI (IEEE 802.11) network), a cellular telephone network, a public telephone network, an extranet, an intranet, and so on. Further, although a single network 106 is shown, the network 106 may be configured to include multiple networks. For instance, a desktop or laptop computer may connect to the Internet via a local area network so that the computer's web browser may access a web page provided by a website within the World Wide Web (WWW). Similarly, a mobile browser in a smart phone may access a web page within a corporate intranet via a cellular telephone network. A wide variety of other instances are also contemplated.

In FIG. 1, the server 102 and the client device 104 are illustrated as including a respective processor 108, 110; a respective memory 112, 114; and a respective network interface 116, 118. In the following discussion, elements of the server 102 are described with reference to FIG. 1. Respective elements and/or reference numbers related to the client device 104 are shown in parentheses. Where appropriate, elements of the client device 104 are described separately.

The processor 108 (110) provides processing functionality for the server 102 (client device 104) and may include any number of processors, micro-controllers, or other processing systems and resident or external memory for storing data and other information accessed or generated by the server 102 (client device 104). The processor 108 (110) may execute one or more software programs that implement techniques described herein. The processor 108 (110) is not limited by the materials from which it is formed or the processing mechanisms employed therein, and as such, may be implemented via semiconductor(s) and/or transistors (e.g., electronic integrated circuits (ICs)), and so forth.

The memory 112 (114) is an example of a computer-readable storage media that provides storage functionality to store various data associated with the operation of the server 102 (client device 104), such as the software program and code segments mentioned above, or other data to instruct the processor 108 (110) and other elements of the server 102 (client device 104) to perform the steps described herein. Although a single memory 112 (114) is shown, a wide variety of types and combinations of memory may be employed. The memory 112 (114) may be integral with the processor 108 (110), stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the client device 104, the memory 114 may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The network interface 116 (118) provides functionality to enable the server 102 (client device 104) to communicate with one or more networks, such as network 106. In various implementations, the network interface 116 (118) may include a variety of components such as modems, routers, wireless access points, cellular telephone transceivers, and so forth, and any associated software employed by these components, e.g., drivers, configuration software, and so on. In FIG. 1, the network interface 116 (118) is illustrated as being an internal component of the server 102 (client device 104). However, in some implementations, one or more components of the network interface 116 (118) may be external components coupled to the server 102 (client device 104) via a wired or wireless connection.

The client device 104 may further include a browser 120, which may be implemented as a software application stored in memory 114 and executed by the processor 110 of the client device 104. The browser 120 allows the client device 104 to display and interact with web pages provided by the server 102. The browser 120 may be configured in a variety of ways. For example, the browser 120 may be configured as a web browser suitable for use by a full resource device with substantial memory and processor resources, e.g., a personal computer, a laptop computer, a game console, and so on. In other implementations, the browser 120 may be configured as a mobile browser suitable for use by a low-resource device with limited memory and/or processing resources (e.g., a PDA, a smart phone, a cell phone, and so on). Such mobile browsers may be configured to conserve memory and processor resources, for instance, but may offer fewer browser functions than full function web browsers.

As illustrated in FIG. 1, the server 102 may include a media player module 122, which may be implemented as a software application stored in memory 112 and executed by the processor 108 of the server 102. The media player module 122 is representative of functionality to provide persistent media playback across a web browsing session without the installation of client side components. In an implementation, the media player module 122 is configured as a media player 124 that is served via the network 106 by the server 102. Web pages 126 within a website, such as an online digital media store website 128, may then be served via the network 106 for display with the media player 124 by the browser 120 of the client device 104. The media player module 122 integrates the web pages 126 with the media player 124 so that the media player 124 is persistently displayed by the browser 120 during the browsing session, e.g., during navigation among the web pages 126 of the website 128. In embodiments, the media player 124 is configured as a web page in which subsequent web pages 126 of the online digital media store website 128 are presented. For example, the browser 120 may display each web page 126 with the media player 124, which may be displayed as a fixed toolbar. Example media players 124 are illustrated in FIGS. 5 and 6.

In implementations, the media player 124 is configured to play media files that may be configured as a variety of different media types. Example media types include audio (e.g., music, talk, soundtracks, audio podcasts, and so on), video (e.g., movies, video podcasts, and so on), games, software applications, and so on. Media may be selected from one or more of the web pages 126 of the online media store website 128 and added to and/or removed from a queue within the media player 124 for eventual playback as the user navigates among the web pages 126 of the website 128.

The media player module 122 may further be representative of functionality to provide rich and contextual discovery during playback that allows for delivery of targeted media, e.g., targeted marketing, content targeted to the currently playing media item or user, and so forth. In an implementation, the media player module 122 generates relevant media suggestions based on an applicable context, such as through an analysis of the user's choices of media that were added to a queue of the media player 124. For example, media may be suggested that is by the same artist or similar artists, that is of the same genre, or that was selected by others who also selected media that was added to the queue by the user, and so forth. Further discussion of the persistent media playback techniques may be found in relation to the following discussion.

Generally, any of the functions described herein may be implemented using software, firmware, hardware (e.g., fixed logic circuitry), manual processing, or a combination of these implementations. The terms "module" and "functionality" as used herein generally represent software, firmware, hardware or a combination thereof. In the case of a software implementation, for instance, a module represents executable instructions that perform specified tasks when executed on a processor, such as the processors 108, 110 of the server 102 and client device 104 of FIG. 1, respectively. The program code may be stored in one or more tangible computer readable media, examples of which include respective memory 112, 114 of the server 102 and client device 104 of FIG. 1. The features of the techniques described below are platform-independent, meaning that the techniques may be implemented on a variety of commercial computing platforms having a variety of processors.

Example Procedures

The following discussion describes procedures that implement techniques to provide persistent media playback across a web browsing session without installation of client side components. Aspects of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 2:
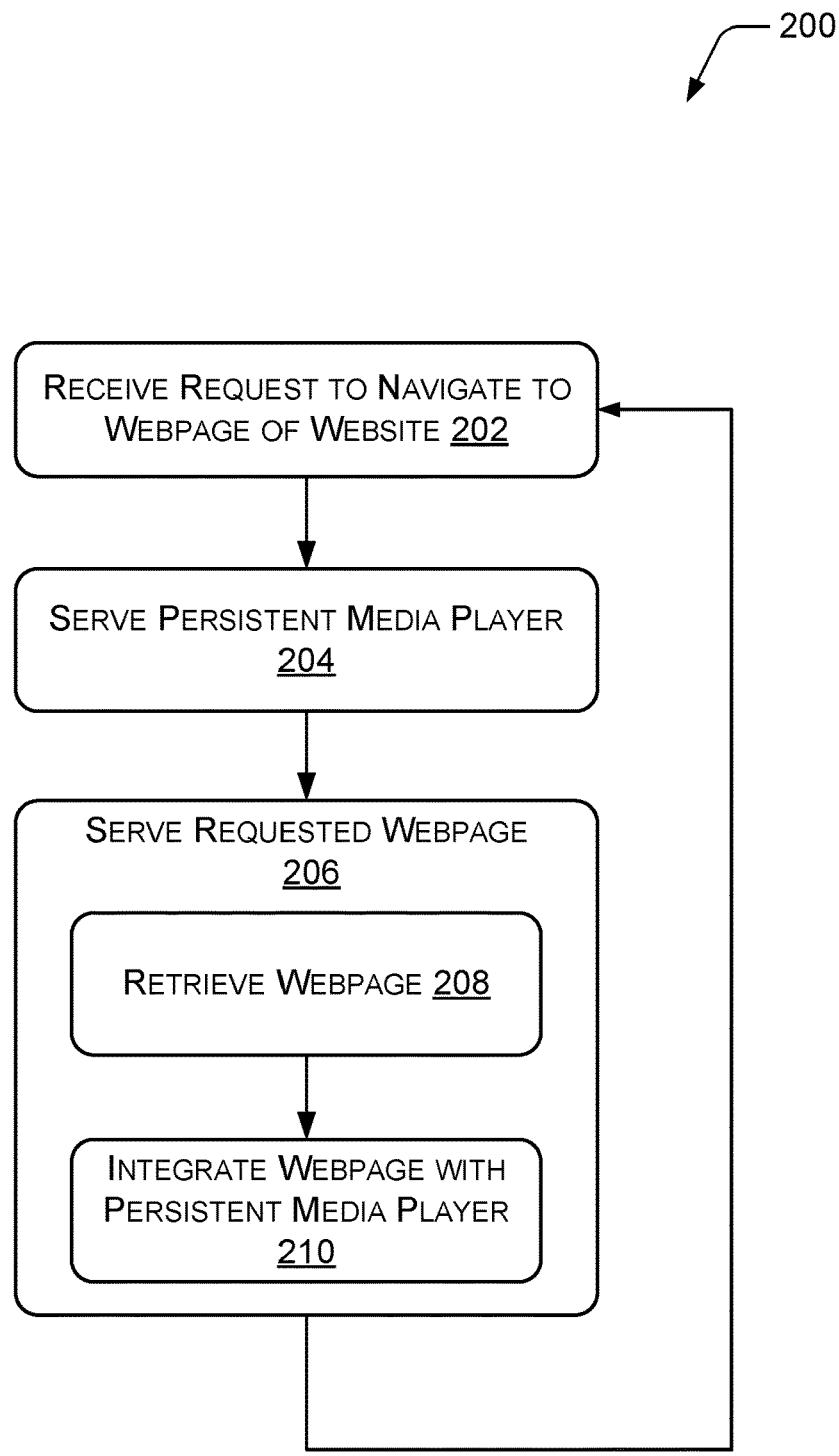
FIG. 2 is a flow diagram depicting a procedure in an example implementation in which persistent media playback is provided across a web browsing session.

FIG. 2 depicts a procedure 200 in an example implementation in which persistent media playback is provided across a web browsing session. As illustrated, a request to navigate to a web page of a website is received (block 202). In an implementation, the request is received to navigate to a web page 126 of an online media store website 128 to access media available from the website via the web page 126. For example, a user may utilize the browser 120 of the user's client device 104 to access the website 128, e.g., by entering the Uniform Resource Locater (URL) of a web page 126 within the website 128, by selecting a link to a web page 126 within the website 128, and so forth.

A persistent media player is then served (block 204). For instance, a media player 124 may be served by a server 102 associated with the online media store website 128. In one or more embodiments, the persistent media player is implemented as a web page using one or more hypertext markup language (HTML) documents that are configured to facilitate interaction with the user to provide playback of media.

The requested web page is then served (block 206). As illustrated, the web page may be retrieved (block 208) and integrated with the persistent media player (block 210) so that the media player is persistently displayed with the web page. For example, the requested web page may be retrieved and inserted into the media player, which is configured as another web page. In this manner, an operation may be performed on the web page to manipulate data within the other web page (e.g., the media player). In this way, the media player remains accessible via the browser.

The procedure 200 may be repeated when the user requests navigation to other web pages 126 of the website 128. Therefore, the media player 124 may be persistently displayed during the browsing session, e.g., during navigation between web pages 126 of the website 128. For example, the user may utilize the browser 120 to navigate to a second web page 126 within the website 128, e.g., by entering the URL of the web page 126, selecting a link to the web page 126, using navigation controls furnished by the browser 120, and so forth. The procedure 200 is then repeated so that the second web page 126 may be displayed with the media player 124, which remains persistent within the browser display, e.g., the media player 124 remains at least substantially unchanged in appearance, size, and location within the display when the second web page is opened.

In an implementation, web pages 126 are inserted into the existing media player 124 when served. In this manner, the media player 124 may be served (block 204) less often than the other web pages 126 of the website 128, e.g., once during the browsing session, each time a particular web page such as a "home page" is accessed, at a predetermined interval, and so on. In other implementations, the persistent media player is served (block 204) each time a web page 126 within the website 128 is accessed. In this manner, the media player 124 is refreshed each time a web page 126 is accessed.

Figure 3:
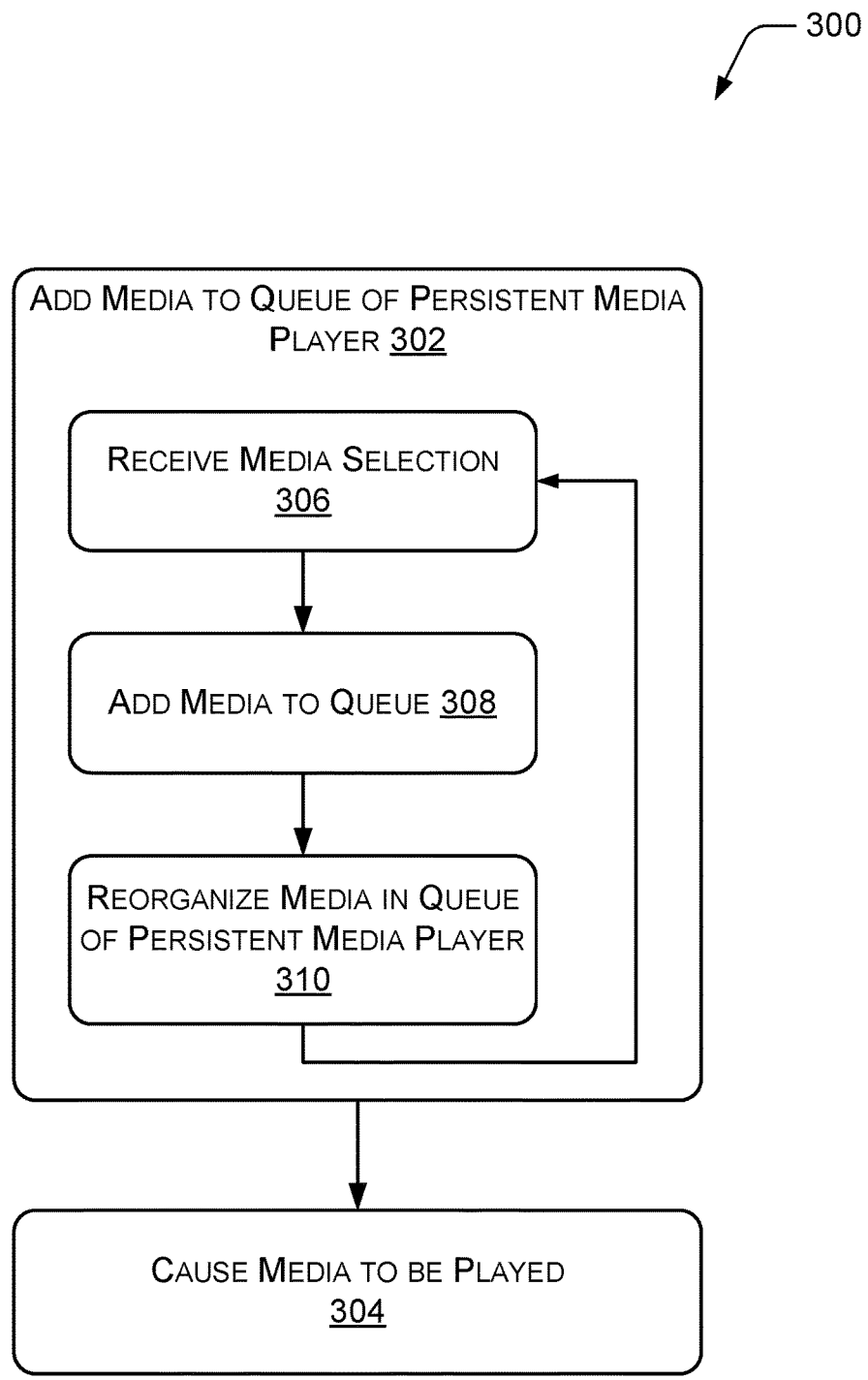
FIG. 3 is a flow diagram depicting a procedure in an example implementation in which a variety of media may be added to a queue of a persistent media player and played.

FIG. 3 depicts a procedure 300 in an example implementation in which a variety of media may be added to a queue of a persistent media player. As illustrated, media may be added to the queue of the persistent media player (block 02) to cause the media to be played by the media player (block 304).

In an implementation, a media selection is received (block 306) that identifies media to be added to the queue. For example, a user may select media from a web page 126 of an online media store website 128 to add to the queue. The selected media may then be added to the queue (block 308).

Media added to the queue may further be reorganized within the queue (block 310). For example, media may be arranged initially within the queue in the order in which the media was originally added to the queue. Thereafter, the order of playback for the media may be altered so that media is played in a order that is different from the order in which the media was added to the queue. For example, a user may wish to play a media item added to the cue before playing other media items already within the cue when the media item was added. The user may thus reorganize the media items within the queue, e.g., by dragging and dropping the media items in the order desired. Additionally, media may be removed from a queue so that the media is not played. For example, the user may remove a media item from the queue that the user no longer wishes to play, e.g., by dragging and dropping the media item outside of the media player.

As shown through the loop illustrated for block 306-310 in FIG. 3, additional media may be queued and organized as additional media selections are received. The media are then caused to be played (block 304) in the order queued until the media player is closed. In this manner, the user may navigate between web pages 126 of the website 128 without stopping playback of the media.

Figure 4:
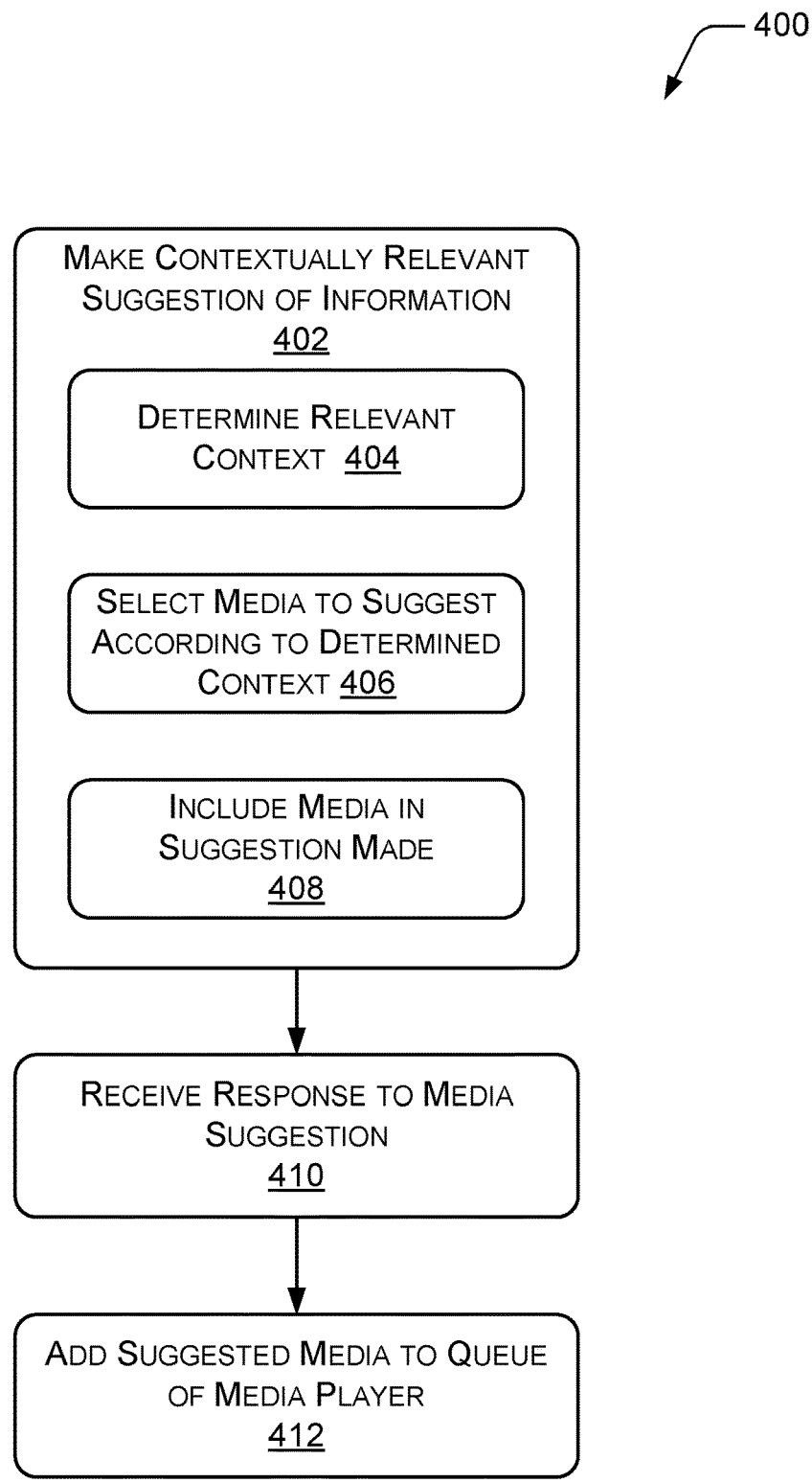
FIG. 4 is a flow diagram depicting a procedure in an example implementation in which contextually relevant information is provided during playback of media.

FIG. 4 illustrates a procedure 400 in an example implementation in which contextually relevant information is provided during playback of media by a persistent media player. The procedure 400 provides integration of the media player 124 with relevant media discovery capabilities to provide contextual discovery during a playback experience. As illustrated, a contextually relevant suggestion of information is made (block 402), such as additional media of interest to the user, and so forth. In an implementation, a relevant context is first determined (block 404) that is to be used to select media for inclusion in a suggestion. For example, the user may view a prompt displayed in the media player 124 to identify a context for use in selecting media. Media may then be selected according to the determined context (block 406) and included in a suggestion made to the user (block 408).

Media may be determined to be relevant in a number of ways in view of the determined context. For example, media relevancy may be determined based on media that is currently being played by the media player 124, media that is in the queue of the media player 124, is identified as relevant by the user (e.g., directly and/or indirectly based on a user profile), is part of a targeted promotion, and so forth.

A response may be received from the user to the media suggestion (block 410). A variety of user responses are contemplated. For example, a user may choose to select the suggested media for addition to the queue of the media player 124 for playback, ignore the suggestion, delete the suggestion, and so forth. When the user's response is to select the suggested media for addition to the queue of the media player 124 for playback, the suggested media is added to the queue of the media player (block 412).

Example Media Players

This section presents elements of media players that may be generated to provide persistent media playback across a web browsing session. Aspects of the media players may be generated by hardware, firmware, software, or a combination thereof. In portions of the following discussion, reference will be made to the environment 100 of FIG. 1; the procedures 200, 300, and 400 of FIGS. 2, 3, and 4, respectively; and/or other example environments and procedures.

Figure 5A:
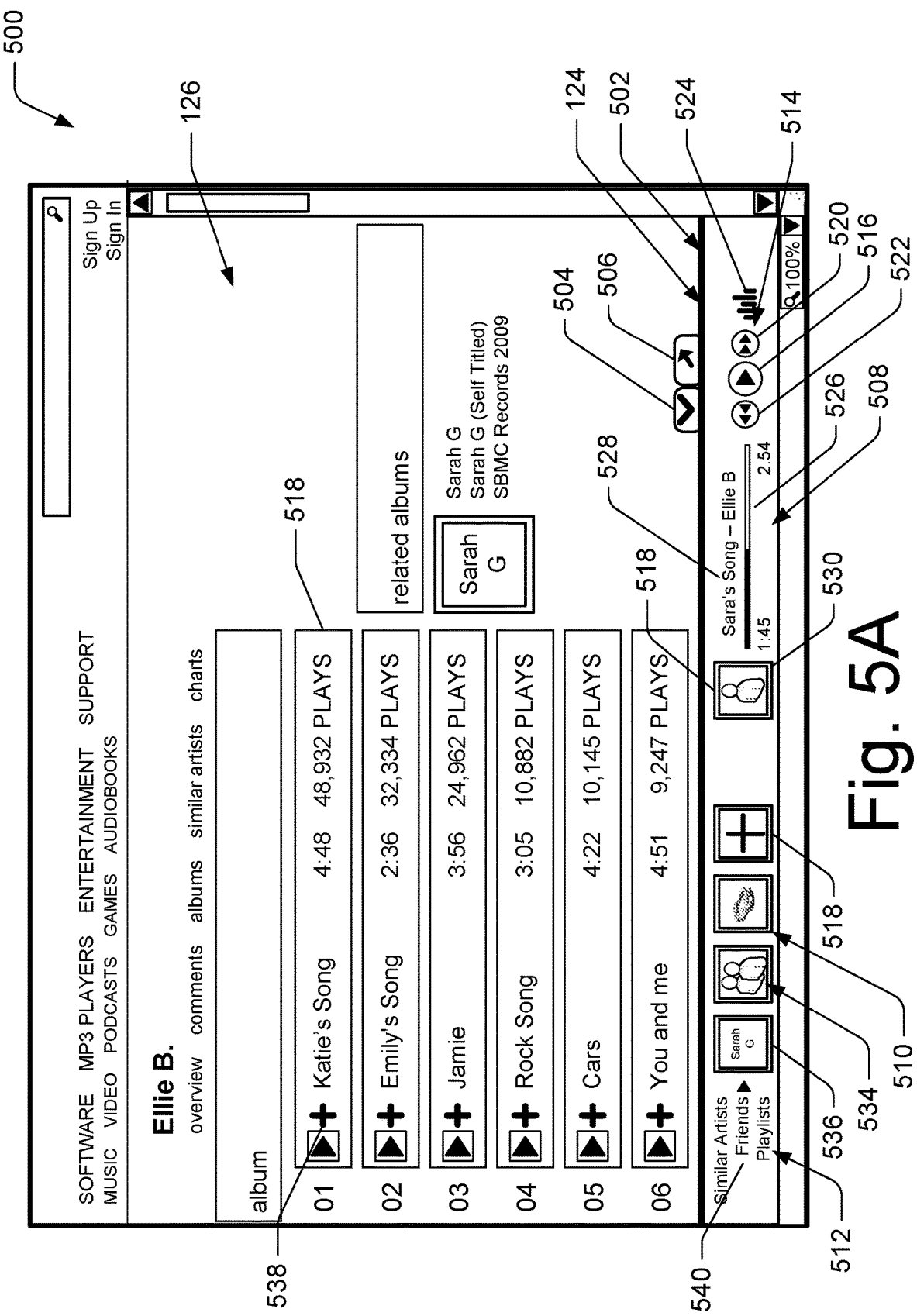
FIG. 5A is an illustration depicting an example persistent media player and web page.
Figure 5B:
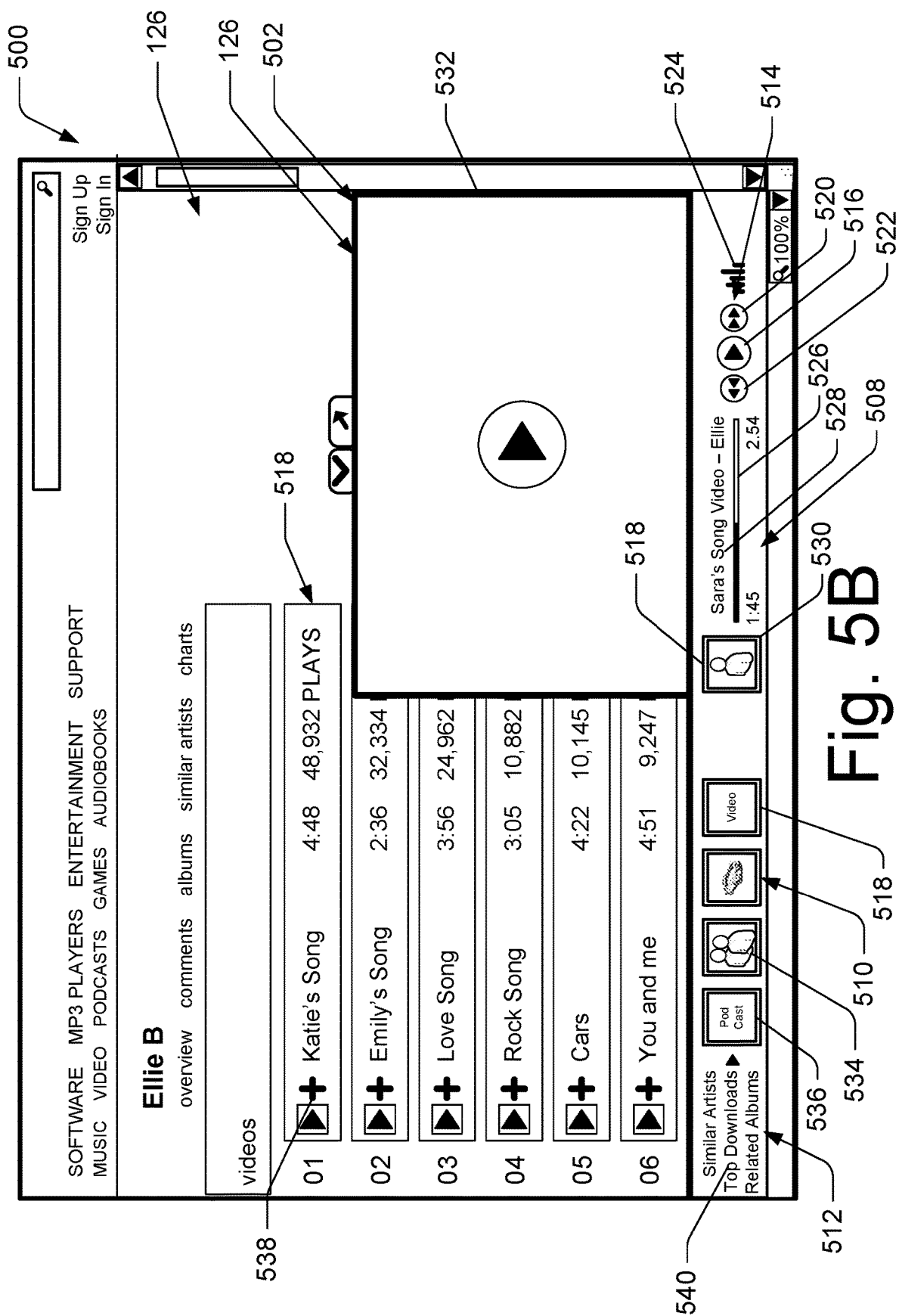
FIG. 5B is an illustration depicting an example persistent media player and web page, wherein the persistent media player is configured to play a video.

FIGS. 5A and 5B illustrate a display 500 of a browser 120 that includes an example media player 124 and web page 126. As illustrated, the media player 124 may be configured as a task bar 502 that is persistently displayed in the display 500 of the browser 120 (FIG. 1). In FIGS. 5A and 5B, the task bar 502 is illustrated as being positioned adjacent to the bottom of the browser display 500, e.g., below the displayed web page 126. However, it is contemplated that the task bar 502 may be displayed in any part of the browser display 500 (e.g., at the top of the display 500, at a side of the display 500, and so on), may be movable within the web page (e.g., as a persistent pop-up display), and so on. Controls (e.g., tabs 504 & 506) may be provided to allow functionality such as moving the task bar 502, hiding the task bar 502, sizing the task bar 502, and so on. Further, the task bar 502 may be configured to appear integrated with the web page 126. For example, the web page 126 may include elements such as frames, colors, textures, combinations of these elements, and so on, that are configured to be consistent with like elements of the web page 126.

The task bar 502 may include various segments that provide functionality to facilitate persistent media playback across a web browsing session without the installation of client-side components. For example, in FIGS. 5A and 5B, the illustrated task bar 502 includes a transport control segment 508, a queue segment 510, and a contextual discovery segment 512.

In embodiments, the transport control segment 508 provides functionality for controlling playback of media by the media player 124. For example, the transport control segment 508 may include various transport controls 514 such as a play/pause button 516 (e.g., to initiate, pause or stop playback of media items 518), a next/fast forward button 520 (e.g., to skip or fast forward media items 518), a previous/rewind button 522 (e.g., to replay or rewind media items 518), sound/video quality controls 524, (e.g., an equalizer display, sound mixing controls), and so forth.

The transport control segment 508 may further include a media playback status bar 526 that provides functionality to display the status of a media item 518 currently being played. The transport control segment 508 may also be configured to allow the user to select playback from a point within the media item 518 (e.g., by selecting a point within the playback status bar 526 for playback), and so forth. A variety of information 528 about the media item 518 may also be displayed. For example, the information 528 may describe a title and name of the artist that performed the content of the media item 518 and may include indicia 530 such as album/video cover art, artist photographs, and so forth that are associated with the media item currently being played. As illustrated, the information 528 may be displayed with the media playback status bar 526 within the transport control segment 508; although a variety of other examples are also contemplated.

FIG. 5B illustrates the media player 124 as being configured for playback of media items 518 having visual content such as video, podcasts, games, and so on. As shown, the transport control segment 508 may be expanded to include a visual content display area 532. The visual content display area 532 may be included when media items contain visual content (e.g., videos, podcasts, games, and so on) to display the visual content. In embodiments, the visual content display area 532 is dynamic such that it is hidden when visual content is not available, e.g., when a media item 518 contains audio content and not video content as illustrated in FIG. 5A.

The queue segment 510 provides functionality to display media that is queued for subsequent output by the media player 124. For example, the queue segment 510 includes a queue 534 of media items 518 to be played by the media player 124. In FIGS. 5A and 5B, the media items 518 within the queue 534 may be displayed as indicia 536 such as album/video cover art, title and artist, and so on. However, it is contemplated that the media items 518 within the queue 534 may be represented in other manners such as within a list, by animated icons, and so on.

In implementations, the queue 534 may be configured to include media items 518 that may be configured as a variety of different media types. Thus, a queue 534 may be configured to include media items 518 of a common media type (e.g., each media item 518 within the queue 534 is configured as a song), or of a variety of different media types, e.g., some media items 518 within the queue 534 may be configured as songs, while other media items 518 within the queue 534 may be configured as videos, podcasts, and so on.

Media may be added to the queue 534 in a variety of ways. For example, media may be selected from web pages 126 within the browser display 500 and added to the queue 534 for playback by the media player 124. In the embodiment illustrated, the web page 126 is provided by an online media store website 128. The web page 126 includes various offerings of media that are available to the user for playback by the media player 124. To select one of the media offerings from the web page for inclusion in the queue 534, a "pluck" icon ("+") 538 may be selected that is associated with the media item 518. The media item 518 is then be added to the queue 534 in response to the selection.

In one or more implementations, the media item 518 that is plucked from the web page is added to the left of the queue 534 when the pluck icon 538 is selected. The media item 518 may then be shifted to the right as playback of media items 518 that are higher in the queue 534 is completed and/or as other media items 518 are added to queue 534. When the media item 518 is played by the media player 124, the media item 518 is shifted to the transport control segment 508. Media queued for playback by the media player 124 may be reordered within the queue 534, e.g., by dragging a media item 518 to be reordered to a desired position in the queue. Media items 518 may also be deleted from the queue 534.

In implementations, the queue 534 remains persistent during navigation to other web pages. Thus, the user may navigate among the various web pages 126 of the website 128 without interrupting playback of media by the media player 124. For example, the user may select music for inclusion in the queue from a first web page 126, then navigate to a second web page from which the user selects one or more videos for inclusion in the queue 534. Each of these selections may be made without interrupting playback of the selected media.

The contextual discovery segment 512 provides functionality to suggest additional media that may interest a user. The contextual discovery segment 512 also allows for delivery of targeted media, e.g., targeted marketing, content targeted to the currently playing media item or user, and so forth. As shown, the contextual discovery segment 512 includes one or more search contexts 540 (e.g., "Similar Artists," "Friends," "Queues," "Top Downloads," "Related Albums," and so on) from which a suggestion of information may be based. For example, a user may select the illustrated "Similar Artists" search context to receive suggestions of media that are similar to the media item 518 that is currently being played, media items 518 that were added to the queue 534 for later playback, and so on. Suggestions may be made in a number of ways, such as displayed within the web page 126 (e.g., via a "pop-up" window), within the task bar 502, and so on.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
serving a first webpage having a first address for display by a device, the first webpage including a link to a second webpage having a second address and a link to a third webpage having a third address;
based on user-selection of the link to the second webpage, serving audio or video of the second webpage for playback via the device after the device navigates from the first webpage to the second webpage;
based on user-selection of the first webpage while serving the audio or video of the second webpage, serving the audio or video of the second webpage with the first webpage so that the audio or video of the second webpage is played by the device after the device navigates from the second webpage back to the first webpage;
based on user-selection of the link to the third webpage, ending serving the audio or video of the second webpage and beginning serving audio or video of the third webpage for playback via the device after the device navigates from the first webpage to the third webpage; and
based on user-selection of the first webpage while serving the audio or video of the third webpage, serving the audio or video of the third webpage with the first webpage so that the audio or video of the third webpage is played by the device after the device navigates from the third webpage back to the first webpage.

2. The method of claim 1, where the first webpage, second webpage, and third webpage are displayed by a web browser of the device.

3. The method of claim 1, where the audio or video of the second webpage is played as an integrated component of the first webpage after the device navigates from the second webpage back to the first webpage, and where the audio or video of the third webpage is played as an integrated component of the first webpage after the device navigates from the third webpage back to the first webpage.

4. The method of claim 1, where the audio or video of the second webpage is served for playback by the device without installing client-side components on the device.

5. The method of claim 1, where the second webpage includes a link to the first webpage, and where user-selection of the first webpage includes user-selection of the link to the first webpage.

6. The method of claim 1, where user-selection of the first webpage includes user-selection of a browser control.

7. The method of claim 1, where serving the audio or video of the second webpage with the first webpage includes serving the audio or video of the second webpage as a pop-up window within the first webpage.

8. The method of claim 1, further comprising, while serving the audio or video of the third webpage with the first web page, receiving a user input to add audio or video of a fourth webpage to a playback queue, and serving the audio or video of the fourth webpage with the first webpage once playback of the audio or video of the third webpage ends.

9. A computing device comprising:
   a processor; and
   a computer-readable storage device holding instructions executable by the processor to:
      serve a first webpage having a first address for display by a remote device, the first webpage including a link to a second webpage having a second address and a link to a third webpage having a third address;
      based on user-selection of the link to the second webpage, serve audio or video of the second webpage for playback via the remote device after the remote device navigates from the first webpage to the second webpage;
      based on user-selection of the first webpage while serving the audio or video of the second webpage, serve the audio or video of the second webpage with the first webpage so that the audio or video of the second webpage is played by the remote device after the remote device navigates from the second webpage back to the first webpage;
      based on user-selection of the link to the third webpage, end serving the audio or video of the second webpage and begin serving audio or video of the third webpage for playback via the remote device after the remote device navigates from the first webpage to the third webpage; and
      based on user-selection of the first webpage while serving the audio or video of the third webpage, serve the audio or video of the third webpage with the first webpage so that the audio or video of the third webpage is played by the remote device after the remote device navigates from the third webpage back to the first webpage.

10. The computing device of claim 9, where the first webpage, second webpage, and third webpage are displayed by a web browser of the remote device.

11. The computing device of claim 9, where the audio or video of the second webpage is played as an integrated component of the first webpage after the remote device navigates from the second webpage back to the first webpage, and where the audio or video of the third webpage is played as an integrated component of the first webpage after the remote device navigates from the third webpage back to the first webpage.

12. The computing device of claim 9, where the audio or video of the second webpage is served for playback by the remote device without installing client-side components on the remote device.

13. The computing device of claim 9, where the second webpage includes a link to the first webpage, and where user-selection of the first webpage includes user-selection of the link to the first webpage.

14. The computing device of claim 9, where user-selection of the first webpage includes user-selection of a browser control.

15. The computing device of claim 9, where serving the audio or video of the second webpage with the first webpage includes serving the audio or video of the second webpage as a pop-up window within the first webpage.

16. The computing device of claim 15, where the instructions are further executable to, while serving the audio or video of the third webpage with the first web page, receive a user input to add audio or video of a fourth webpage to a playback queue, and serve the audio or video of the fourth webpage with the first webpage once playback of the audio or video of the third webpage ends.

17. A method comprising:
   serving a media collection preview for display by a device, the media collection preview including a first link to a first media content item and a second link to a second media content item;
   based on user-selection of the first link to the first media content item, serving the first media content item for presentation by the device;
   based on a user command to return to the media collection preview from the first media content item, serving the first media content item as an integrated component of the media collection preview;
   based on user-selection of the second link to the second media content item while serving the first media content item as an integrated component of the media collection preview, ending serving the first media content item as an integrated component of the media collection preview and beginning serving the second media content item for presentation by the device;
   based on a user command to return to the media collection preview from the second media content item, serving the second media content item as an integrated component of the media collection preview.

18. The method of claim 17, where the first media content item is served for presentation by the device without installing client-side components on the device.

19. The method of claim 17, where the user command to return to the media collection preview from the first media content item includes user-selection of a link to the media collection preview.

20. The method of claim 17, where the user command to return to the media collection preview from the first media content item includes user-selection of a browser control.

* * * * *